United States Patent

[11] 3,576,224

[72] Inventor William C. Susor
    Toledo, Ohio
[21] Appl. No. 783,969
[22] Filed Dec. 16, 1968
[45] Patented Apr. 27, 1971
[73] Assignee The Reliance Electric and Engineering Company
    Toledo, Ohio

[54] WEIGHING SYSTEM WITH ANALOG INPUT SIGNALS AND DIGITAL CUTOFF SIGNALS
    4 Claims, 4 Drawing Figs.
[52] U.S. Cl. ................................................... 177/47, 177/116
[51] Int. Cl. .................................................... G01g 23/18
[50] Field of Search ....................................... 177/25, 46, 47, 70, 116, (Digitizers Digest); 235/92 (50); 73/1 (B)

[56] References Cited
    UNITED STATES PATENTS

| | | | |
|---|---|---|---|
| 2,928,033 | 3/1960 | Abbott | 235/92(50) |
| 2,974,863 | 3/1961 | Williams, Jr. et al. | 177/(Digitizers Digest) |
| 3,035,648 | 5/1962 | Williams, Jr. | 177/70 |
| 3,169,185 | 2/1965 | Nines | 177/(Digitizers Digest) |
| 3,254,728 | 6/1966 | Aquadro et al. | 177/70X |
| 3,445,638 | 5/1969 | Montgomerie | 235/92(50) |
| 3,446,299 | 5/1969 | Leonowicz | 177/25 |
| 3,464,508 | 9/1969 | Engle et al. | 177/116X |

Primary Examiner—Richard B. Wilkinson
Assistant Examiner—George H. Miller, Jr.
Attorney—Thomas H. Grafton ABSTRACT: A digital cutoff system comprising a weighing scale, means for electing a desired weight, signal means for producing preset digital signals and additional digital signals in accordance with load upon the scale, and means for detecting coincidence between the combined digital signals and the desired weight. Desired preset weight in accordance with dribble cutoff, final cutoff and over and under tolerance detection is accomplished by varying the signal means.

PATENTED APR 27 1971 3,576,224
SHEET 1 OF 2
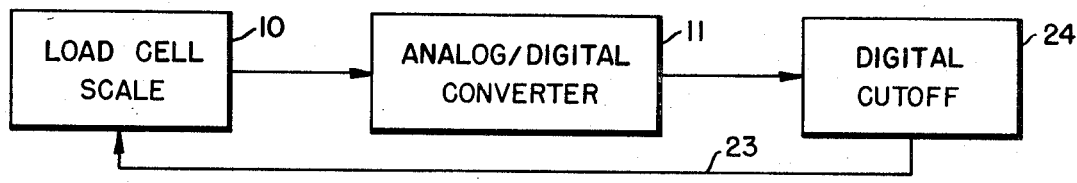
Fig-1
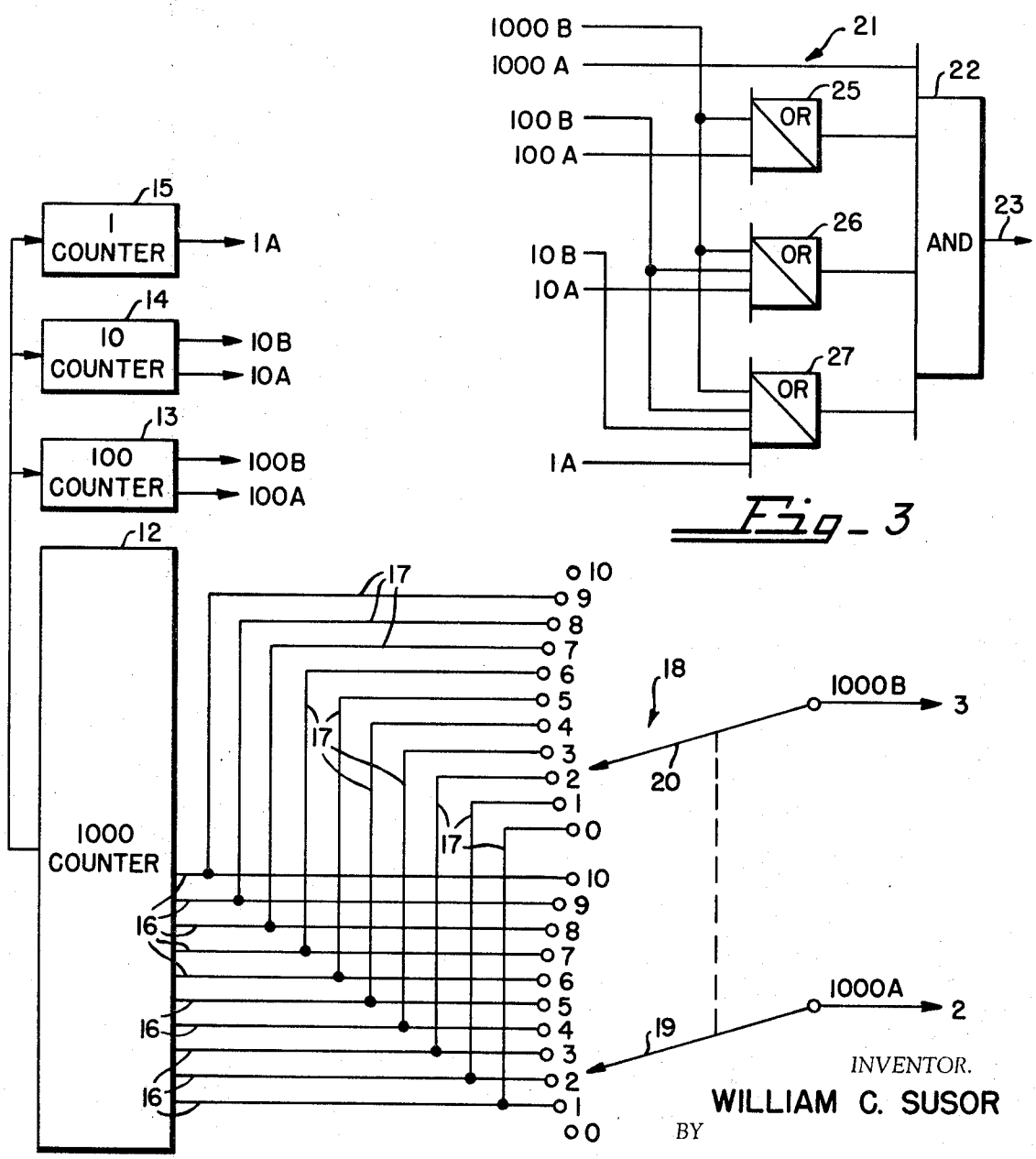
Fig-2
Fig-3
INVENTOR.
WILLIAM C. SUSOR
BY
Thomas H. Grafton
ATTORNEY

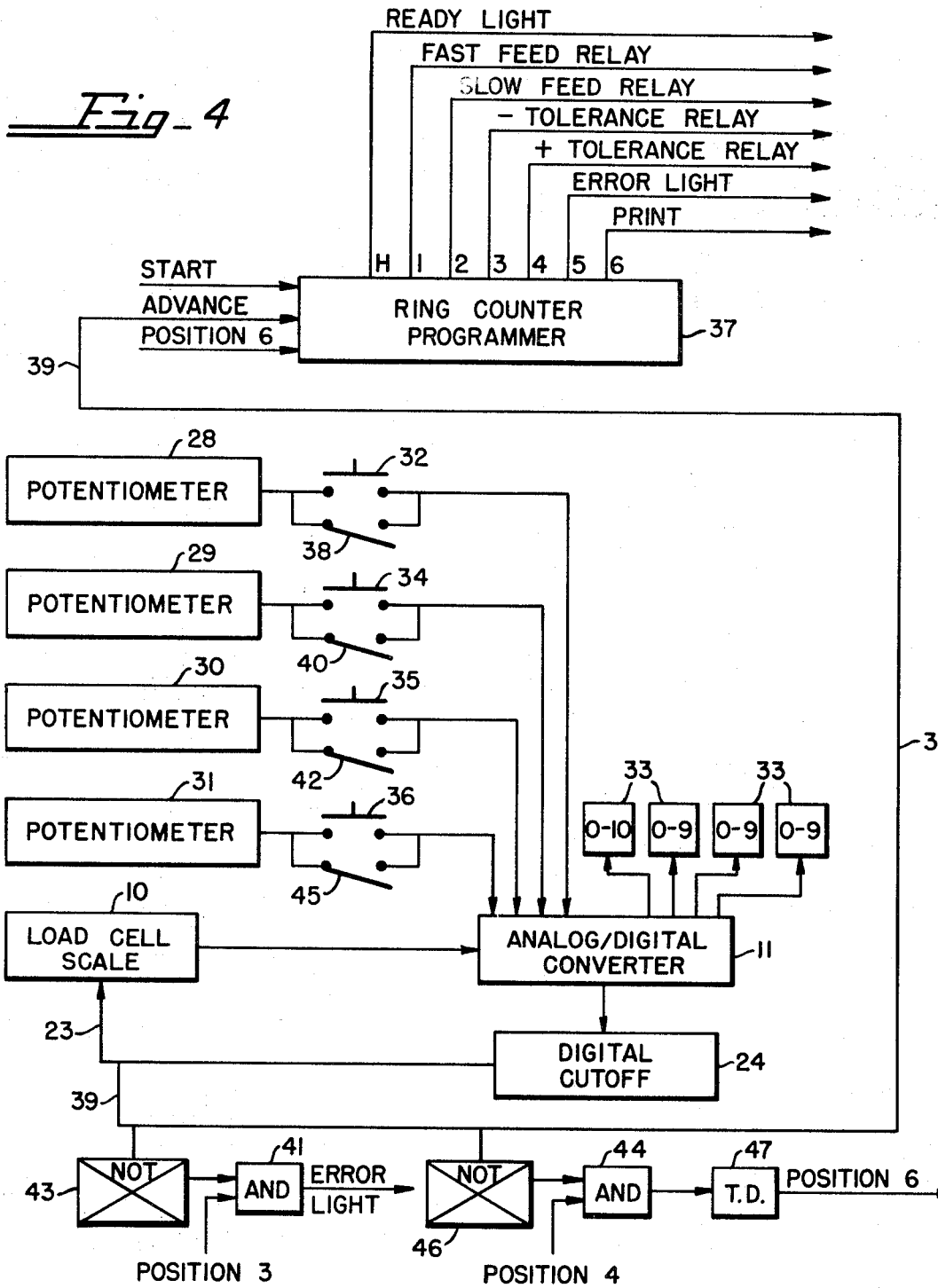

//

3,576,224

WEIGHING SYSTEM WITH ANALOG INPUT SIGNALS AND DIGITAL CUTOFF SIGNALS

BACKGROUND OF THE INVENTION

The invention relates to systems for detecting coincidence between the output of a condition responsive digital signal source and a selector for selecting the condition which may be, for example, weight on a batching scale or parts on a counting scale.

SUMMARY OF THE INVENTION

Specifically, the invention envisions the use of an accurate weight-indicating device to achieve calibrated preactivation, such as dribble cutoff. Presetting of the indicating device is accomplished by adjusting potentiometers in accordance with a desired preset weight, the analog signals produced by the potentiometers being changed to digital signals by the basic weight-indicating device. In this fashion, potentiometers of low cost may be utilized with negligible error because the preset indication is made by the basic indicating device which has very high accuracy.

The objects of this invention are to improve digital cutoff systems, to improve techniques in weighing materials in a batching process, and to provide a digital-batching system of superior accuracy.

BRIEF DESCRIPTION OF THE DRAWING

FIG. 1 is a block diagram of an electrical or electronic batch-weighing scale system;

FIG. 2 is a wiring diagram showing part of the analog-to-digital converter and part of the digital cutoff shown in FIG. 1;

FIG. 3 is a block diagram showing the rest of the digital cutoff; and

FIG. 4 is a block diagram of the batch-weighing scale system shown in FIG. 1 with a programmer attached for automatic operation.

DESCRIPTION OF THE PREFERRED EMBODIMENT

A load cell scale 10 and an analog-to-digital converter 11 are disclosed in U.S. application Ser. No. 557,708 commonly assigned filed Jun. 15, 1966 in the name of Robert D. Kohler, now U.S. Pat. No. 3,525,991 issued Aug. 25, 1970. The weighing scale 10 establishes an analog signal (voltage) corresponding to the weight of an object being weighed and the converter 11 produces counterbalancing voltage steps. Counters 38—41 shown in the pending application accumulate the weight readout count; their counterparts are shown as counters 12—15 in FIG. 2. One of the four identical counters is shown in detail in FIG. 6 of the pending application and has 10 sustained output leads. The 1,000 place counter 12 has 10 sustained output leads 16 (digital signals in accordance with load upon the scale) ending in terminals identified as "1—10, " respectively. The counter 12 is a ring counter but differs from the conventional ring counter in that as the count proceeds the stages do not turn off but rather remain on to put sustained outputs on the leads 16 until at the tenth count all 10 stages are on. The 1,000 place counter 12 also has 10 additional output leads 17 connecting the output leads 16 to the additional terminals identified as "0—9." The 1 terminal shown in the lower part of FIG. 2 is connected to the upper 0 terminal, the lower 2 terminal is connected to the upper 1 terminal, etc. The lower set of terminals includes a blank 0 terminal and the upper set includes a blank 10 terminal. One count in the counter 12 produces an output signal at lower terminal 1 and at its connected terminal 0, two counts in the counter 12 produces such output signals plus an output signal at lower terminal 2 and at its connected terminal 1, etc.

A ganged switch 18 is used to select the 1,000 place in a desired weight. As shown in FIG. 2, the selected digit in the 1,000 place of the desired weight is a 2. The lower switch deck 19 receives a two-digital signal (indicated as 1000A—2) while the upper switch deck 20 receives a three-digital signal (indicated as 1000B—3). Similar ganged switches not shown are used to select the 10 and 100 places in the desired weight; the digital signals in the 10 place being indicated as 10A and 10B and the digital signals in the 100 place being indicated as 100A and 100B, it being understood that the counters 13 and 14 each have double sets of sustained output leads and terminals which are similar to those shown connected to counter 12. Counter 15 (1 place) has only a single set of sustained output leads and terminals which are like leads 16 and their terminals and a single-decked switch for selecting the 1 place in a desired weight as indicated by output 1A in connection with counter 15.

The digital cutoff is useful in a weighing system which automatically batches differing weights of several ingredients into a weigh single hopper. The switches are moved to select a desired weight having four number places, the switches connecting the outputs 1000A and B, 100A and B, 10A and B, and 1A to a coincidence circuit 21 shown in FIG. 3. As the first material flows onto the scale, sustained output digital signals appear at the terminals until the coincidence circuit detects coincidence between the digital signals and the desired weight, whereupon the circuit 21 which includes an AND gate 22 produces a cutoff signal 23 which controls a relay that in turn controls a valve cutting off the flow of the material onto the scale. Relays in a weighing scale-batching system for dribble cutoff, final cutoff, and over and under tolerance detection are disclosed in U.S. Pat. No. 3,106,974 issued Oct. 15, 1963 in the name of Roger B. Williams, Jr. For the sake of simplicity, FIGS. 1—3 disclose a digital cutoff 24 for one material; digital cutoff 24 includes the switch 18, the three switches not shown for counters 13—15, and the coincidence circuit 21.

The coincidence circuit 21 also includes an OR gate 25 which receives the 1000B and 100A signals, an OR gate 26 which receives the 1000B, 100B, and 10A signals, and an OR gate 27 which receives the 1000B, 100B, 10B and 1A signals. The three outputs of the OR gates partially enable the AND gate 22 which is completely enabled by the 1000A signal.

Ordinarily in operation, the desired weight of one batch ingredient is selected by positioning the four switches (one shown as switch 18) to their respective terminals. As the batch ingredient flows onto the scale 10, digital signals are produced. For example, if the number chosen is 2,875 pounds, two counts in the 1,000 counter 12, eight counts in the 100 counter 13, seven counts in the 10 counter 14, and five counts in the 1 counter 15 produce the desired digital signals at the respective terminals which are transferred by the switches as a 1000A signal directly to the AND gate 22, a 100A signal to the OR gate 25, a 10A signal to the OR gate 26, and a 1A signal to the OR gate 27. The three outputs of the OR gates and the direct 1000A signal enable the AND gate 22 which then produces its cutoff signal 23 to cut off the flow of material to the scale 10.

If, however, a large lump of the material falls upon the scale just prior to cutoff, the weight may run quickly beyond the coincidence point. In the above example, the desired weight is 2,875 pounds. If three counts are entered in the 1,000 counter 12, sustained signals appear on terminals 1, 2, and 3 at lower switch deck 19 and on terminals 0, 1 and 2 at upper switch deck 20. The lower switch deck 19 applies the 1000A—2 signal directly to the AND gate 22 and the upper switch deck 20 applies the 1000B—3 signal to the three OR gates 25—27 as overriding signals so that the AND gate 22 produces its cutoff signal 23 even though too much load is upon the scale. The usual coincidence circuit can sense coincidence only and not coincidence or condition beyond coincidence as does the circuit 21.

Similarly in overweight circumstances, a 100B signal is applied to OR gates 26 and 27 as an overriding signal and signal 10B is applied to OR gate 27 as an overriding signal. This arrangement is not necessary in the least significant place (1A signals).

Each of the counters 12—15 is a condition responsive digital signal source for each place in a number to be selected, the number being in accordance with a desired condition, e.g. weight. Each of the sources produces, as load is placed upon the scale 10, a desired signal corresponding to a desired digit and each of the sources, except the least significant, also produces an additional digital signal corresponding to the next higher digit whenever the weight of the load upon the scale is higher by one digit in the respective place. The circuit 21 is responsive to the desired digital signals in the absence of any additional digital signal and produces a normal output signal for each place in the number (signal 1000A and outputs of the three OR gates when signals 100A, 10A and 1A are applied to the OR gates) and also is responsive to any said additional digital signal to produce an overriding output signal (outputs of the three OR gates when signals 1000B, 100B and 10B are applied to the OR gates) for all places of significance less than the place corresponding to the additional digital signal. The overriding output signals take the place of the normal output signals resulting in one output signal for each place in the number. The AND gate 22 receives the four output signals and produces a cutoff signal 23 at coincidence or beyond coincidence.

Essentially the digital cutoff system is for obtaining a desired condition, e.g. weight, and includes means for comparing a condition responsive digital signal to a digital reference, such means including the terminals of leads 16, means (switch deck 19) for generating a first signal A when the digital signal equals the digital reference, and means (switch deck 20) for generating a second signal B when the digital signal is greater than the digital reference, no signals A or B being generated when the digital signal is less than the digital reference. The coincidence circuit 21 is means for controlling the desired condition in accordance with signals A and B.

The foregoing dribble cutoff, a preact cutoff, and the foregoing over and under tolerance detection are selected by means of potentiometers 28—31. In the foregoing example, for the sake of simplicity, a batch ingredient of 2,875 pounds was described as being weighed out with a single cutoff. In actual practice, there are dribble and preact cutoffs and over and under tolerance detection for each of the batch ingredients.

Still using the example of 2,875 pounds as the desired weight of the ingredient, this weight is selected by positioning the four switches to 2,875 (one shown as switch 18) as described above. If it is desired to have 2,800 pounds fed at a fast rate and 75 pounds fed at a slow rate, a preset weight of 75 pounds is selected by depressing a pushbutton 32 to connect the potentiometer 28 to the analog-to-digital converter 11 and moving the slider of the potentiometer 28 until the analog-to-digital converter 11 reads 75 pounds on its indicators 33 (shown as indicators 42 in the above U.S. Application Ser. No. 557,708). The voltage output from the potentiometer 28, as are the outputs from the potentiometers 29—31, is applied as an input to the analog-to-digital converter 11 in the same manner as the voltage output from the load cell scale 10 is applied. The analog signal from the potentiometer 28 may be considered as a fake analog signal from the load cell scale 10 as an aid in understanding the invention. The weighing scale 10 produces analog signals in accordance with load upon the scale and the potentiometers or preset means 28—31 produce analog signals in accordance with desired preset weights and the converter 11 changes the combined analog signals to digital signals which are indicated in terms of weight by the indicators 33. When the pushbutton 32 is released, the indicators 33 read zero. As hereinafter described, the 75 pounds preset causes the first or dribble cutoff to come when 2,800 pounds of the ingredient is upon the scale (2,875 pounds minus the preset 75 pounds). In short, presetting of the converter 11 is accomplished by adjusting the potentiometers 28—31.

If it is desired to have the preact cutoff come 5 pounds before the desired weight of 2,875 is upon the scale because of material still falling upon the scale after cutoff, the inertia of the mechanical control system, etc., a pushbutton 34 is depressed to connect the potentiometer 29 to the converter 11 and the slider of the potentiometer 29 is moved until the indicators 33 reads 5 pounds Release of the pushbutton 34 returns the indicators 33 to 0.

If it is desired to have an under tolerance detection of 3 pounds, a pushbutton 35 is depressed to connect the potentiometer 30 to the converter 11 and the slider of the potentiometer 30 is moved until the indicators 33 reads 3 pounds Release of the pushbutton 35 returns the indicators 33 to 0.

If it is desired to have an over tolerance detection of 3 pounds, a pushbutton 36 is depressed to connect the potentiometer 31 to the converter 11 and the slider of the potentiometer 31 is moved until the indicators 33 reads minus 3 pounds. Release of the pushbutton 36 returns the indicators 33 to 0.

Automatic operation is programmed by a conventional ring counterprogrammer 37 which has seven output positions.

In programmer position H, the programmer output causes a ready light to light.

A "Start" signal applied to the programmer 37, by a start button, causes it to advance from position H to position 1. The ready light goes out and the position 1 output signal from the programmer 37 operates a "Fast Feed Relay" which both opens a valve to feed the batch ingredient onto the scale 10 and closes a contact 38 in parallel with the pushbutton 32. Closing of the contact 38 applies the preset analog signal corresponding to 75 pounds from the potentiometer 28 to the converter 11 so that the indicators 33 reads 75 pounds before load is applied to the scale. At coincidence (2,800 pounds upon scale), the cutoff signal 23 as described above operates the fast feed relay which then both closes the valve feeding the batch ingredient onto the scale 10 and opens the contact 38. The cutoff signal 23 also is applied as "Advance" signal 39 to advance the programmer 37 to position 2.

The position 2 output signal from the programmer 37 operates a "Slow Feed Relay" which both opens a valve to feed the batch ingredient onto the scale 10 and closes a contact 40 in parallel with the pushbutton 34. Closing of the contact 40 applies the preset analog signal corresponding to 5 pounds from the potentiometer 29 to the converter 11. At coincidence (desired weight of 2,875 pounds should be on scale), the cutoff signal 23 operates the slow feed relay which then both closes the valve feeding the batch ingredient onto the scale 10 and opens the contact 40. "Advance" signal 39 (produced whenever cutoff signal 23 is produced) advances the programmer 37 to position 3.

The position 3 output signal from the programmer 37 partially enables an AND gate 41 and operates a "—Tolerance Relay" which closes its contact 42 in parallel with the pushbutton 35. Closing of the contact 42 applies the preset analog signal corresponding to 3 pounds from the potentiometer 30 to the converter 11. If the weight upon the scale actually is the desired weight of 2,875 pounds, the converter 11 detects 2,875 pounds plus the fake 3 pounds (potentiometer 30), i.e., 2,878 pounds. As described above, the coincidence circuit 21 detects coincidence at coincidence and beyond coincidence so that coincidence is detected and the cutoff signal 23 is produced, meaning that the undertolerance check has been passed (sufficient load upon the scale). "Advance" signal 39 (produced whenever cutoff signal 23 is produced) advances the programmer 37 to position 4. However, if coincidence is not detected that means there is not sufficient load upon the scale. A NOT gate 43, because it does not receive an advance signal 39, applies its inverted output as an input to the partially enabled AND gate 41 (partially enabled by programmer position 3 signal) which causes an "Error Light" to light.

The position 4 output signal from the programmer 37 partially enables an AND gate 44 and operates a "+Tolerance Relay" which closes its contact 45 in parallel with the pushbutton 36. Closing of the contact 45 applies the preset analog signal corresponding to minus 3 pounds from the potentiometer 31 to the converter 11. If the weight upon the scale actually is the desired weight of 2,875 pounds, the converter detects 2,875 pounds less the fake 3 pounds, i.e., 2,872 pounds. If coincidence is not detected that means there is not too much load upon the scale (over tolerance check passed). A NOT gate 46, because it does not receive an advance signal 39, applies its inverted output as an input to the partially enabled AND gate 44 which applied its output to a time delay 47 that after the expiration of the delay applies its output to force the advance of the programmer 37 to position 6. The position 6 output signal from the programmer 37 causes a printer to operate which when printing is completed closes a limit switch resetting the programmer 37 to its H position (ready light lit). However, if coincidence is detected that means there is too much load upon the scale. Coincidence produces the "Advance" signal 39 to advance the programmer 37 for position 4 to position 5. The position 5 output signal from the programmer 37 causes "Error Light" to light.

In addition to the advantage of using potentiometers 28—31 of low cost with negligible error because the preset indication is made by the basic converter 11 which has very high accuracy, the one set of digital control switches controls the four conditions of first cutoff, preact and plus and minus tolerance, and the one coincidence circuit 21 also is used to control such four conditions.

It is to be understood that the above description is illustrative of this invention and that various modifications thereof can be utilized without departing from its spirit and scope.

I claim:

1. A digital-weighing system comprising, in combination, weighing scale means for producing analog signals in accordance with load upon the scale, preset means for producing analog signals in accordance with desired preset weight, means for presetting a desired weight, analog to digital converter means for combining the weighing analog signal and the preset analog signal and changing the combined analog signals to digital signals, means for indicating the combined digital signals in terms of the weight of load upon the scale, the converter means including said means for presetting a desired weight, means for detecting coincidence between the combined digital signals and the desired weight and for producing an output signal for each digit in the desired weight, and gate means for receiving the output signals and for producing a cutoff signal, whereby presetting of the converter means is accomplished by varying the preset means until the desired presetting is indicated by the indicating means.

2. A digital weighing system according to claim 1 wherein the preset means includes a variable source of analog signals and switch means for applying the analog signals to the converter means.

3. A digital-weighing system comprising, in combination, a weighing scale, means for selecting a desired weight, signal means for producing preset digital signals and additional digital signals in accordance with load upon the scale and for combining said digital signals, and means for detecting coincidence between the combined signals and the desired weight, wherein the signal means includes variable analog means for producing analog signals which are converted to said preset digital signals.

4. A digital-weighing system comprising, in combination, weighing scale means for producing analog signals in accordance with load upon the scale, potentiometer means for producing analog signals in accordance with desired preset weight, analog to digital converter means for combining said analog signals and changing the combined analog signals to digital signals, means for selecting a desired weight, and means for detecting coincidence between the digital signals and the desired weight and for producing an output signal for each digit in the desired weight.